(12) United States Patent  
Tiesler

(10) Patent No.: US 7,093,880 B1  
(45) Date of Patent: Aug. 22, 2006

(54) CENTER MOUNT VISOR ARM ASSEMBLY

(75) Inventor: John Marstan Tiesler, Harrison Township, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/904,354

(22) Filed: Jul. 20, 2005

(51) Int. Cl.
*B60J 3/00* (2006.01)

(52) U.S. Cl. .................. 296/97.9; 296/97.1; 296/97.11; 296/97.12; 296/97.13

(58) Field of Classification Search ............... 296/97.1, 296/97.4, 97.9, 97.11, 97.12, 97.13
See application file for complete search history.

(56) References Cited

U.S. PATENT DOCUMENTS

| | | | | |
|---|---|---|---|---|
| 1,795,184 A | * | 3/1931 | Smith .................. | 248/289.11 |
| 1,808,086 A | * | 6/1931 | Ulp ..................... | 296/97.11 |
| 2,932,539 A | * | 4/1960 | Galbraith ............ | 296/97.11 |
| 4,521,047 A | | 6/1985 | Saxman ............... | 296/97 K |
| 5,421,632 A | * | 6/1995 | Adomeit et al. ..... | 296/97.9 |
| 5,445,427 A | * | 8/1995 | Vandagriff .......... | 296/97.6 |
| 6,007,135 A | * | 12/1999 | Alves .................. | 296/97.9 |
| 6,328,370 B1 | * | 12/2001 | Kim .................... | 296/97.11 |
| 6,345,857 B1 | * | 2/2002 | Leary .................. | 296/97.7 |
| 6,619,718 B1 | | 9/2003 | Tiesler ................ | 296/97.1 |
| 6,637,799 B1 | | 10/2003 | Tiesler ................ | 296/97.1 |
| 2003/0160473 A1 | | 8/2003 | Tiesler ................ | 296/97.1 |

\* cited by examiner

*Primary Examiner*—Lori L. Coletta
(74) *Attorney, Agent, or Firm*—Bruce E Harang

(57) ABSTRACT

A center mounted visor assembly for mounting in a vehicle that allows the visor to be rotated downward and upward, from front windshield to side window, and horizontally along the windshield from vehicle side to vehicle center as needed is taught. Provision for vanity power for a vanity light is also taught.

11 Claims, 5 Drawing Sheets

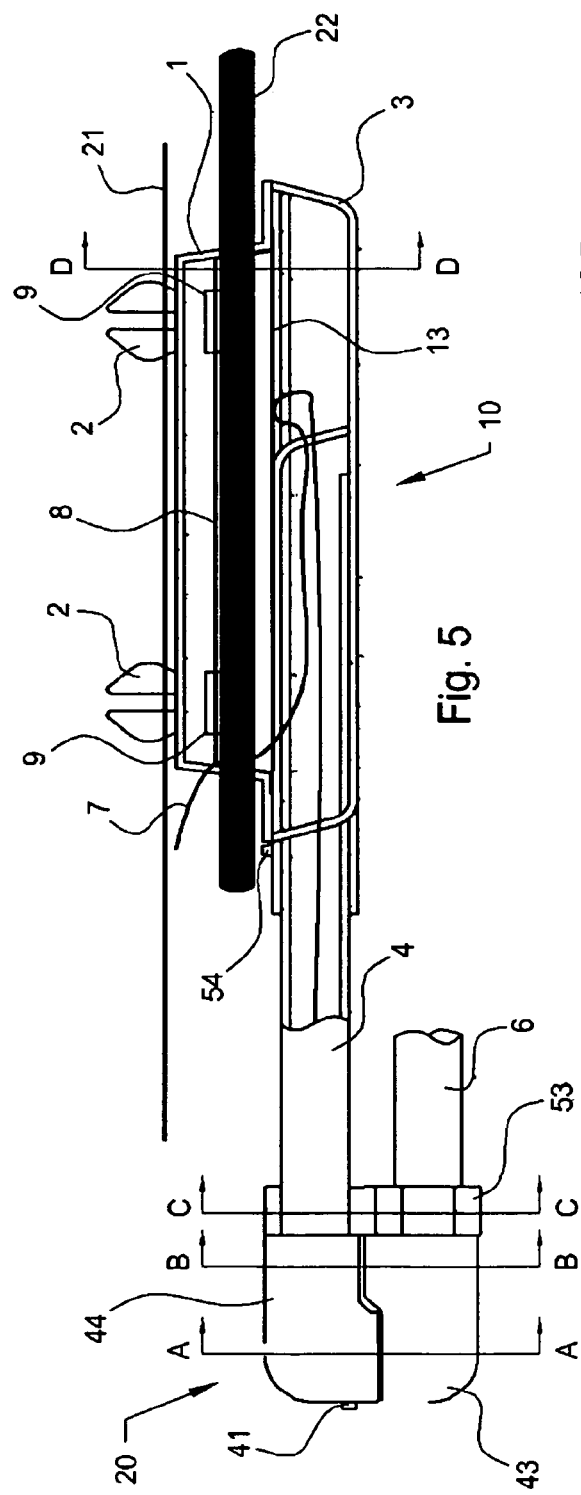
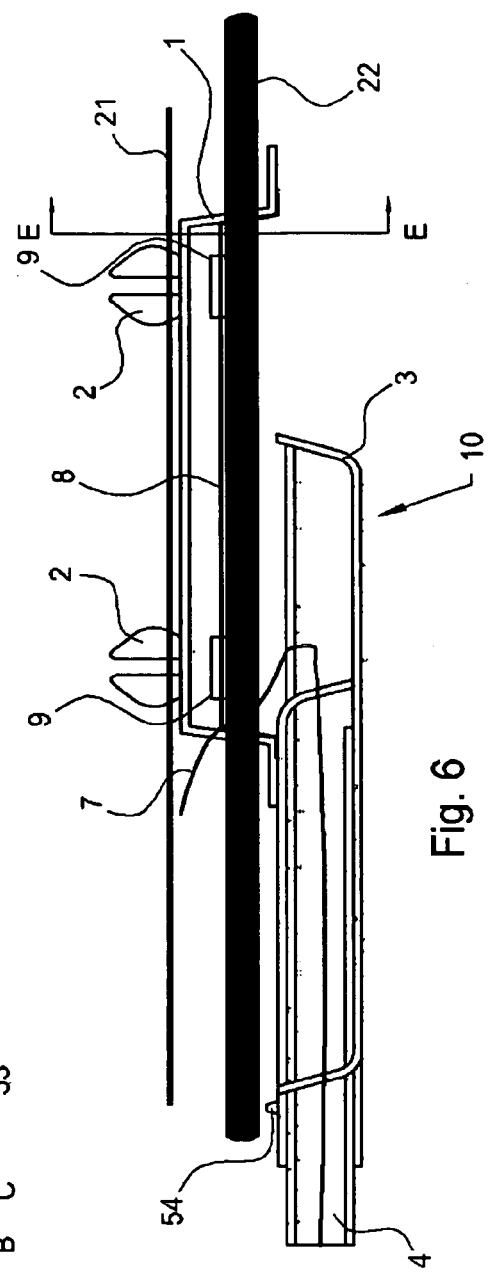
Fig. 5
Fig. 6

CENTER MOUNT VISOR ARM ASSEMBLY

BACKGROUND OF THE INVENTION

1. Field of the Invention

The present invention generally relates to a sun visor assembly mounted to a vehicle in the center area of the headliner. More particularly, the present invention relates to a center mounted sun visor assembly having a sun visor blade that may be used both in the front and side of a vehicle and which may further move horizontally across the front of the vehicle windshield area.

2. Description of the Related Art

The use of sun visors in vehicles is well known. Attached to the vehicle roof adjacent to the windshield, sun visors are made in various sizes and are made from a variety of materials. Typically sun visors are mounted on a bent arm shaft that is attached to the roof header adjacent to each side of the vehicle. The sun visor may be rotated around the bent arm shaft mounting bezel to allow use both in the front and on the side of the vehicle. However, typically even when both sun visors are positioned in the front of the windshield in a down or use position there is a portion of the windshield in the center area that is not shielded by the sun visor and therefore does not block the glare of the sun from the front seat occupants, most importantly the driver.

To overcome this limitation of the typical corner mounted pair of sun visors at least one patent teaches the use of three sun visors mounted across the front of the windshield. This however, requires the use of an additional piece of equipment, an extra assembly procedure, and added cost.

For example, U.S. Pat. No. 4,521,047 issued Jun. 4, 1985 to Saxman teaches the use of three sun visors mounted across the windshield. There is no provision for horizontal movement across the windshield by any of the three sun visors.

U.S. Pat. No. 6,619,718 issued Sep. 16, 2003 to Tiesler teaches a modular sun visor assembly utilizing a side mounted sun visor arm.

U.S. Pat. No. 6,637,799 issued Oct. 28, 2003 to Tiesler teaches another modular sun visor mounted using a side mount sun visor arm.

U.S. Patent Application Publication No. 2003/0160473 published Aug. 28, 2003 to Tiesler teaches yet another modular sun visor utilizing a side mounted sun visor arm.

Accordingly, it is desirable to provide a sun visor assembly that would allow for the use of only two sun visors and which would allow at least one of said sun visors of being capable of moving in horizontally across the windshield to allow for sun blocking in the center of the windshield.

DISCLOSURE OF THE INVENTION

The present invention provides advantages and alternatives over the prior art by providing a center mounted visor that may be used to cover the side window or the windshield over the area from the edge to the center of the windshield as is required.

According to a further aspect of the present invention, there is provided a center mounted visor assembly for use in a vehicle allowing the visor to be raised, lowered, moved from windshield to side window, as well as moved across the windshield comprising in cooperative combination: a center mount assembly comprising: a center mount base having attachment clips for mounting to a vehicle roof header, and retainer clips and slide track retainer clips to attach said center mount base to a vehicle headliner; and a center mount cover moveably attached to said center mount base, and having a fixed arm fixedly attached thereto; a center mount visor bezel assembly comprising: an upper portion having said fixed arm fixedly attached thereto, and further having a ball retaining cavity and ball retaining clip mounting slot; and a lower portion having a ball for connecting said lower portion to said upper portion, and a visor arm fixedly attached thereto; a fixed arm having two ends, one end fixedly attached to said center mount cover and the other end fixedly attached to said upper portion of said center mount visor bezel assembly; and a visor arm fixedly attached to said lower portion of said center mount visor bezel, said visor arm suitable for mounting a visor thereon: thereby providing a visor assembly that allows for a visor to rotate around the axis of said visor arm, said visor arm capable of rotating on its connected end from windshield to side window, and said visor capable of moving laterally along the windshield.

According to yet another aspect of the present invention there is provided a center mounted visor assembly for use in a vehicle allowing the visor to be raised, lowered, moved from windshield to side window, as well as moved across the windshield comprising in cooperative combination: a center mount assembly comprising: a center mount base having attachment clips for mounting to a vehicle roof header, and retainer clips and slide track retainer clips to attach said center mount base to a vehicle headliner, vanity power wiring; and a center mount cover moveably attached to said center mount base, and having a fixed arm fixedly attached thereto; a center mount visor bezel assembly comprising: an upper portion having said fixed arm fixedly attached thereto, vanity power wiring, and further having a ball retaining cavity and ball retaining clip mounting slot; and a lower portion having a ball for connecting said lower portion to said upper portion, a vanity power contact connected to said vanity power wiring, and a visor arm fixedly attached thereto; a fixed arm having two ends, one end fixedly attached to said center mount cover and the other end fixedly attached to said upper portion of said center mount visor bezel assembly; and a visor arm fixedly attached to said lower portion of said center mount visor bezel, said visor arm suitable for mounting a visor thereon: thereby providing a visor assembly that allows for a visor to rotate around the axis of said visor arm, said visor arm capable of rotating on its connected end from windshield to side window, and said visor capable of moving laterally along the windshield.

BRIEF DESCRIPTION OF THE DRAWINGS

FIG. 5 shows a cross section plan top view of the center mount visor arm assembly of the present invention in its center most position.

FIG. 6 shows a cross section plan top view of the center mount visor arm assembly of the present invention in its sideward-extended position.

DESCRIPTION OF THE PREFERRED EMBODIMENTS OF THE INVENTION

Figure 1:
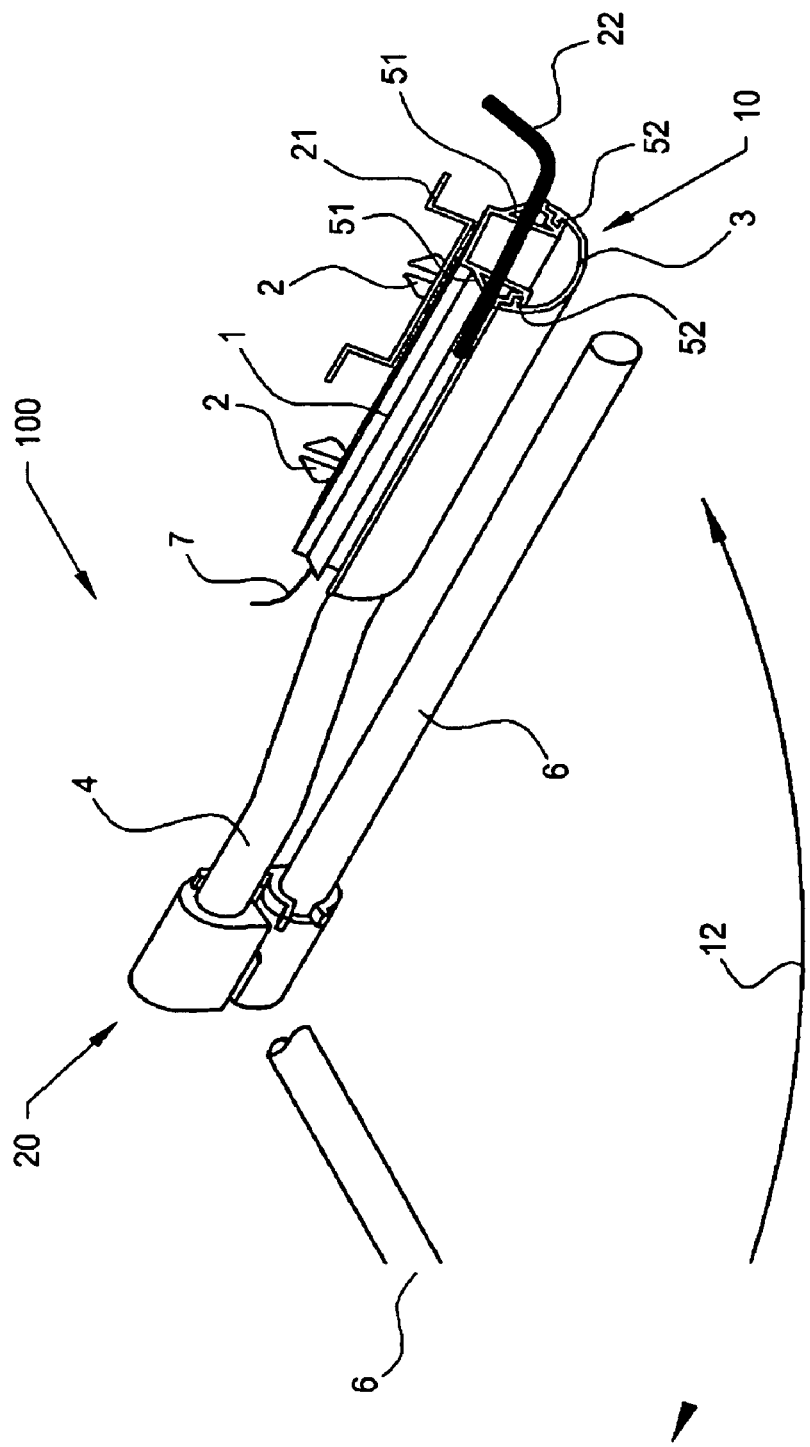
FIG. 1 shows a perspective view of the center mount visor arm assembly of the present invention.

Reference will now be made to the drawings, wherein to the extent possible like reference numerals are utilized to designate like components throughout the various views. Referring to FIG. 1, which presents a perspective view of the of the center mount visor arm assembly 100 comprising a center mount assembly 10, a center mount visor bezel assembly 20, and visor arm 6. Also shown by arrow 12 is the horizontal movement of the center mount assembly 10.

As further shown in FIG. 1 the center mount assembly 10 comprises a center mount base 1 fixedly attached to vehicle roof header 21 by fasteners 2, a center mount cover 3 horizontally moveably attached to mount base 1 by way of sliding tracks of sliding track clips 52 and having fixedly attached to one end of said center mount cover 3 a fixed arm 4 by one of its ends, the other end of fixed arm 4 fixedly attached to visor bezel assembly 20. Also shown is headliner 22 having center mount base 1 fixedly attached thereto by means of retainer clips 51 and slide track retainer clips 52. Fixed arm 4 is preferably hollow to allow the installation of power vanity wiring 7 to run therethrough.

As also shown in FIG. 1, is visor arm 6 rotationally mounted on one of its ends to visor bezel assembly 20. Arrow 12 describing the rotation movement of visor arm 6 from the front to side and back.

Figure 2:
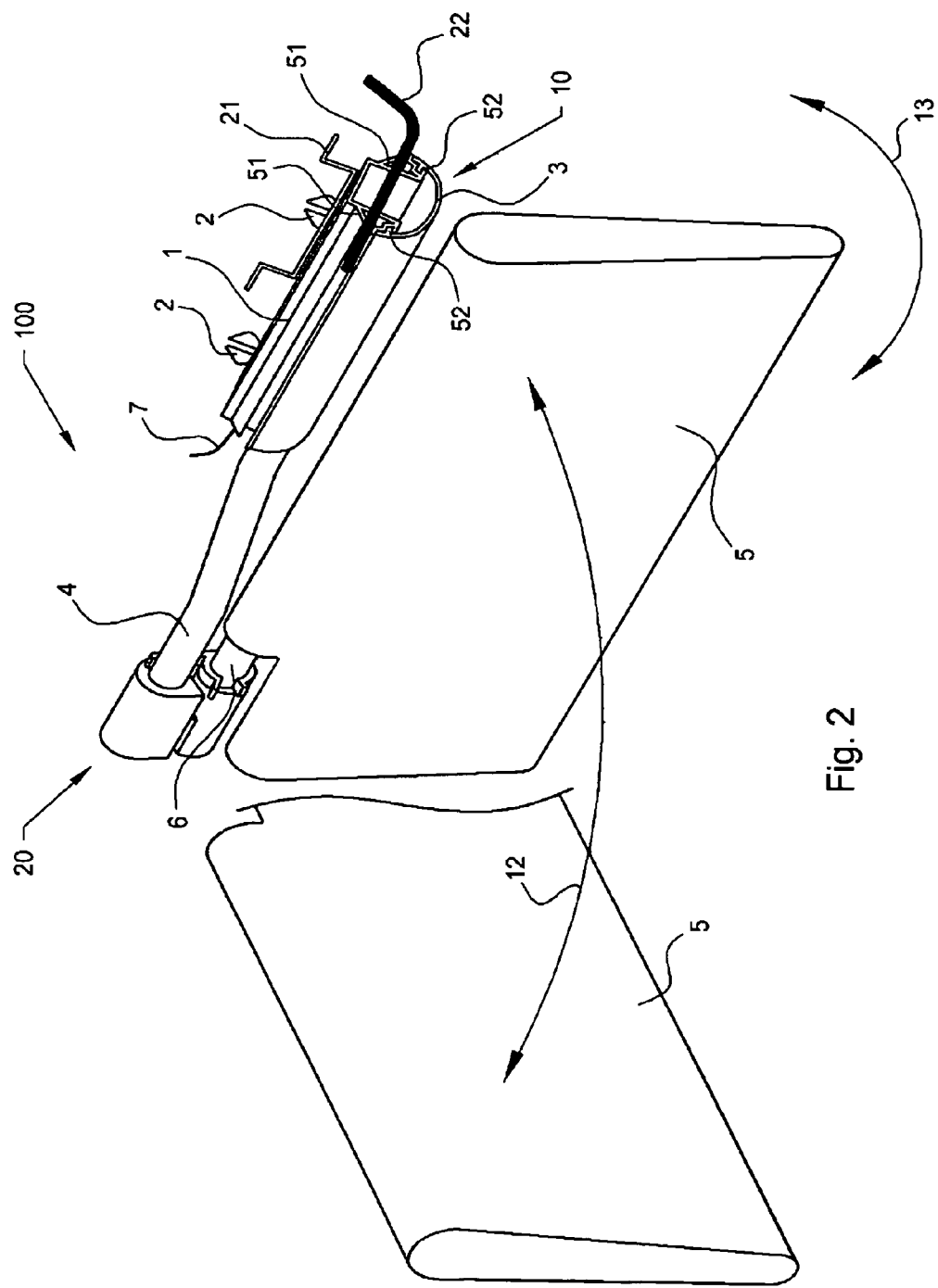
FIG. 2 shows a perspective view of the center mount visor arm assembly and mounted visor blade of the present invention.

Referring now to FIG. 2, there is shown a perspective view of the center mount visor arm assembly 100 comprising a center mount assembly 10, a center mount visor bezel assembly 20, and visor arm 6 with a visor 5 mounted thereon.

As further shown in FIG. 2 the center mount assembly 10 comprises a center mount base 1 having roof header fasteners 2, a center mount cover 3 horizontally moveably attached to mount base 1 by way of sliding tracks of sliding track clips 52 and having fixedly attached to one end of said center mount cover 3 a fixed arm 4 by one of its ends, the other end of fixed arm 4 fixedly attached to visor bezel assembly 20. Also shown is center mount base 1 having headliner retainer clips 51 and slide track retainer clips 52. Fixed arm 4 is preferably hollow to allow the installation of power vanity wiring 7 to run therethrough connecting to vanity power contact 30 (FIG. 4).

As also shown in FIG. 2, is visor arm 6 rotationally mounted on one of its ends to visor bezel assembly 20 and visor 5 mounted on visor arm 6. Arrow 12 describing the rotation movement of visor 5 and visor arm 6 from the front to side and back. Arrow 13 describing the pivoting movement of visor 5 on visor arm 6.

Figure 3:
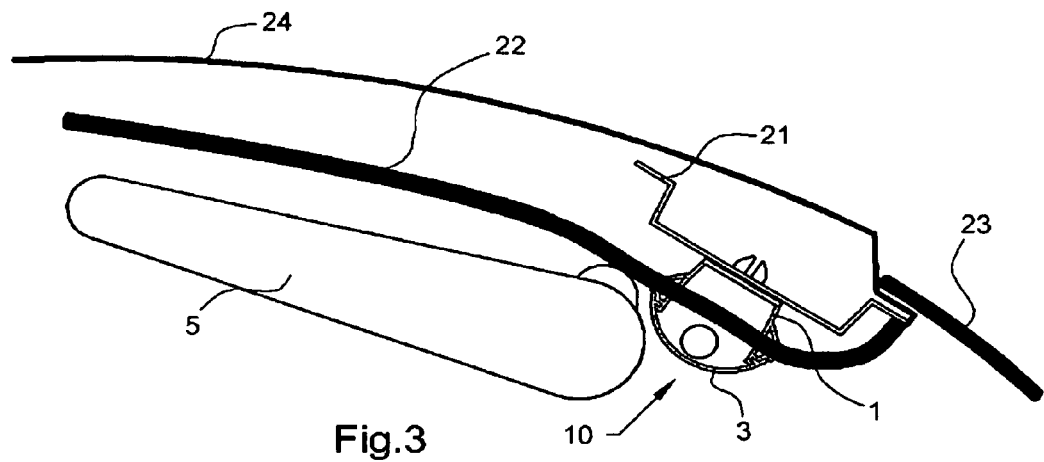
FIG. 3 shows a section plan view of the center mount visor arm assembly and visor blade mounted in the roof of a vehicle.

FIG. 3 shows a section plan view of the center mount visor assembly 100 of the present invention mounted in the roof header 21 of roof 24 and the headliner 22 of a vehicle by means of roof header fasteners 2 and headliner retainer clips 51 and slide track retainer clips 52. Also shown are mount base 1 and center mount cover 3 of center mount assembly 10 as well as visor 5 and windshield 23. The visor 5 is in the up or non-use position as shown here.

Figure 4:
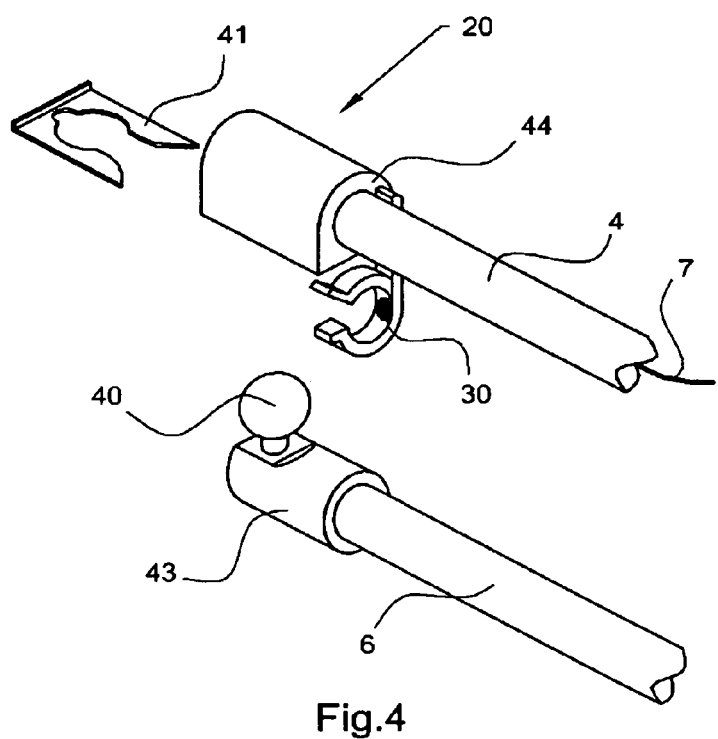
FIG. 4 shows a perspective blow-up view of the visor arm ball mounting system of the present invention.

FIG. 4 shows a partial perspective blow-up view of the visor arm 6 fixedly attached to the lower portion 43 of visor bezel assembly 20 having ball 40 attached thereto and mountable in the upper portion 44 of visor bezel assembly 20 in ball retaining cavity 42 (FIG. 7) and moveably fixed therein by ball clip 41. Also shown is vanity wiring 7, and vanity power contact 30 molded into visor bezel assembly 20 upper portion 44.

Turning now to FIG. 5, there is shown a cross section plan front view of the center mount visor arm assembly 100 in its center most position, comprising center mount assembly 10 having a mount base 1 fixedly attached to vehicle roof header 21 by fasteners 2, center mount cover 3 moveably attached to mount base 1 by way of sliding tracks of sliding track clips 52 (FIG. 1) and having fixedly attached to one end of said center mount cover 3 a fixed arm 4 by one of its ends, the other end of fixed arm 4 fixedly attached to visor bezel assembly 20. Also shown is mount base cover 8, mount base cover locking tabs 9, and mount base cover hinge 13. Visor bezel assembly 20 having an upper portion 44 into which fixed arm 4 is fixedly attached and also having a ball retaining cavity 42 (FIG. 7) for receiving the ball 40 of visor bezel assembly 20 lower portion 43 and said ball 40 (FIG. 4) being retained in said ball retaining cavity 42 by ball retainer clip 41. Lower portion 43 of visor bezel assembly 20 has fixedly attached therein one end of visor arm 6. Also shown is vanity wiring 7, center check 53 and headliner 22.

FIG. 6 shows a cross section plan front view of the center mount visor arm assembly 100 in its side most position, comprising center mount assembly 10 having a mount base 1 having fasteners 2, center mount cover 3 moveably attached to mount base 1 by way of sliding tracks of sliding track clips 52 (FIG. 1) and having fixedly attached to one end of said center mount cover 3 a fixed arm 4 by one of its ends. Also shown is vanity wiring 7 and headliner 22 as well as mount base cover 8 and mount base cover locking tabs 9.

Figure 7:
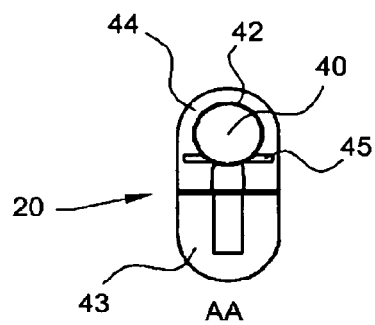
FIG. 7 shows a cross section plan view through line A—A of FIG. 5.

FIG. 7 shows a cross section through section line A—A of FIG. 5 showing the portion of the visor bezel assembly 20 having a upper portion 44 containing a ball retaining cavity 42 and a ball retaining clip slot 45 and a lower portion 43 having a ball 40 mounted thereon. The upper portion 44 and lower portion 43 being held together by the retained ball 40 in retaining cavity 42 by retaining clip 41 (FIG. 4).

Figure 8:
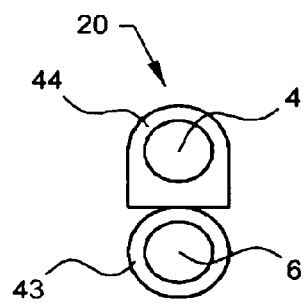
FIG. 8 shows a cross section plan view through line B—B of FIG. 5.

FIG. 8 shows a cross section through section line B—B of FIG. 5 showing that portion of the visor bezel assembly 20 having fixedly attached one end of fixed arm 4 in the upper portion 44, and one end of visor arm 6 fixedly attached in the lower portion 43.

Figure 9:
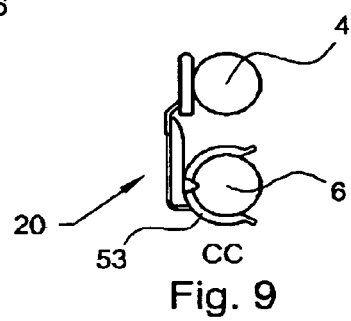
FIG. 9 shows a cross section plan view through line C—C of FIG. 5.

FIG. 9 shows a cross section through section line C—C of FIG. 5 showing that portion of the visor bezel assembly 20 having molded in vanity power contact 30 (FIG. 4) connected to vanity wiring 7 (FIG. 4), center check 53, and one end of visor arm 6 fixedly mounted therein.

Figure 10:
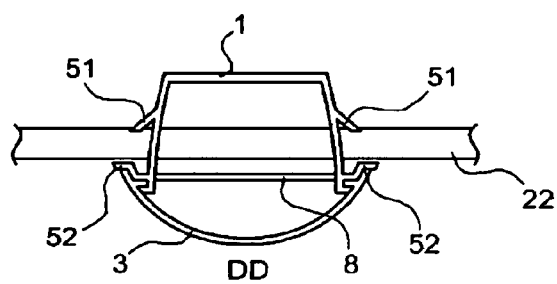
FIG. 10 shows a cross section plan view through line D—D of FIG. 5.

FIG. 10 shows a cross section through section line D—D of FIG. 5 showing the mount base 1 having headliner retainer clips 51 thereon and also having slide track retainer clips 52 thereon. Center mount cover 3 is moveably mounted to mount base 1 by the slide track portion of slide track retainer clips 52. Further is shown the mount base cover 8 and headliner 22.

Figure 11:
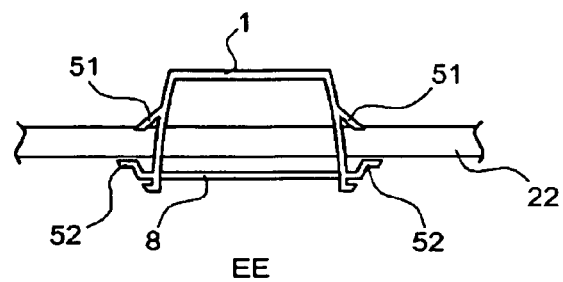
FIG. 11 shows a cross section plan view through line E—E of FIG. 6.

Finally FIG. 11 shows a cross section through section line E—E of FIG. 6 showing mount base 1 mounted in headliner 22 by means of headliner retainer clips 51 and slide track retainer clips 52. Also shown is mount base cover 8.

The vanity wiring 7 may be made of any well-known electrically conductive material, presently preferred is copper metal flatwire. Similarly, the molded in vanity power contact 30 may be made of any well-known electrically conductive material, presently preferred is copper metal. Likewise, the center mount visor arm assembly 100 members may be made of any well-known non-conductive material including, for example, acrylonitrile butadiene styrene (ABS), polypropylene, nylon, and acetyl, preferably the center mount visor arm assembly members are made of the same material as that of the sun visor.

In the preferred embodiment the base mount 1, base mount cover 8, base mount cover locking tabs 9, and base mount cover hinge 13 are all molded as a single plastic unit and the base mount cover hinge 13 is a living hinge. This unit may be injection molded of suitable plastics well known in the art including, for example, polypropylene, nylon, acetyl, and acrylonitrile butadiene styrene (ABS) and the like.

Although the preferred embodiments of the present invention has been disclosed, various changes and modifications may be made without departing from the scope of the invention as set forth in the appended claims.

What is claimed is:

1. A center mounted visor assembly for use in a vehicle allowing a visor to be raised, lowered, moved from windshield to side window, as well as moved across the windshield comprising in cooperative combination:
    a center mount assembly comprising:
        a center mount base having attachment clips for mounting to a vehicle roof header, and retainer clips and slide track retainer
            clips to attach said center mount base to a vehicle headliner; and
        a center mount cover moveably attached to said center mount base, and having a fixed arm fixedly attached thereto;
    a center mount visor bezel assembly comprising:
        an upper portion having said fixed arm fixedly attached thereto, and further having a ball retaining cavity and ball retaining clip mounting slot; and
        a lower portion having a ball for connecting said lower portion to said upper portion, and a visor arm fixedly attached thereto;
    the fixed arm having two ends, one end fixedly attached to said
        center mount cover and the other end fixedly attached to said
        upper portion of said center mount visor bezel assembly; and
    the visor arm fixedly attached to said lower portion of said center
        mount visor bezel, said visor arm suitable for mounting the visor
        thereon:
thereby providing the centered mount visor assembly that allows for the visor to rotate around the axis of said visor arm, said visor arm capable of rotating on its connected end from windshield to side window, and said visor capable of moving laterally along the windshield.

2. The center mounted visor assembly as claimed in claim 1 wherein, said center mounted visor assembly is molded of plastic.

3. The center mounted visor assembly as claimed in claim 2 wherein, said plastic is selected from the group consisting of acrylonitrile butadiene styrene (ABS), nylon, glass filled nylon, polypropylene, acetyl, preferably glass filled nylon, and most preferably 33% glass filled nylon.

4. The center mounted visor assembly as claimed in claim 2 wherein, said center mounted visor assembly is molded as a single unit.

5. The center mounted visor assembly as claimed in claim 4 wherein, said center mount visor assembly base mount and base mount cover are connected by a living hinge.

6. A center mounted visor assembly for use in a vehicle allowing a visor to be raised, lowered, moved from windshield to side window, as well as moved across the windshield comprising in cooperative combination:
    a center mount assembly comprising:
        a center mount base having attachment clips for mounting to a vehicle roof header, and retainer clips and slide track
            retainer clips to attach said center mount base to a vehicle headliner, vanity power wiring; and
        a center mount cover moveably attached to said center mount base, and having a fixed arm fixedly attached thereto;
    a center mount visor bezel assembly comprising:
        an upper portion having said fixed arm fixedly attached thereto, vanity power wiring, and further having a ball
            retaining cavity and ball retaining clip mounting slot; and
        a lower portion having a ball for connecting said lower portion to said upper portion, a vanity power contact connected to said vanity power wiring, and the visor arm fixedly
            attached thereto;
    the fixed arm having two ends, one end fixedly attached to said
        center mount cover and the other end fixedly attached to said
        upper portion of said center mount visor bezel assembly; and
    the visor arm fixedly attached to said lower portion of said
        center mount visor bezel, said visor arm suitable for mounting a visor thereon:
thereby providing the center mounted visor assembly that allows for the visor to rotate around the axis of said visor arm, said visor arm capable of rotating on its connected end from windshield to side window, and said visor capable of moving laterally along the windshield.

7. The center mounted visor assembly as claimed in claim 6 wherein, said center mount visor assembly is molded of plastic.

8. The center mounted visor assembly as claimed in claim 7 wherein, said plastic is selected from the group consisting of acrylonitrile butadiene styrene (ABS), nylon, glass filled nylon, polypropylene, acetyl, preferably glass filled nylon, and most preferably 33% glass filled nylon.

9. The center mounted visor assembly as claimed in claim 7 wherein, said center mounted visor assembly is molded as a single unit.

10. The center mounted visor assembly as claimed in claim 9 wherein, said center mount visor assembly base mount and base mount cover are connected by a living hinge.

11. The center mounted visor assembly as claimed in claim 6 wherein, said vanity power wiring comprises flatwire.

* * * * *